(12) United States Patent
Hasumi et al.

(10) Patent No.: US 12,242,329 B2
(45) Date of Patent: Mar. 4, 2025

(54) TURN ON FUNCTIONAL MODULE AND RELATED FUNCTIONAL MODULE BASED ON GENERATED DISK IMAGE

(71) Applicant: NEC Corporation, Tokyo (JP)

(72) Inventors: Daichi Hasumi, Tokyo (JP); Shigeyoshi Shima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 18/010,969

(22) PCT Filed: Jun. 26, 2020

(86) PCT No.: PCT/JP2020/025306
§ 371 (c)(1),
(2) Date: Dec. 16, 2022

(87) PCT Pub. No.: WO2021/260932
PCT Pub. Date: Dec. 30, 2021

(65) Prior Publication Data
US 2023/0222027 A1   Jul. 13, 2023

(51) Int. Cl.
*G06F 11/00* (2006.01)
*G06F 11/07* (2006.01)

(52) U.S. Cl.
CPC ...... *G06F 11/0772* (2013.01); *G06F 11/0709* (2013.01); *G06F 11/0751* (2013.01); *G06F 11/0793* (2013.01)

(58) Field of Classification Search
CPC ............ G06F 11/0772; G06F 11/0709; G06F 11/0751; G06F 11/0793; G06F 11/0778; G06F 21/55
See application file for complete search history.

(56) References Cited

U.S. PATENT DOCUMENTS 9,274,902 B1 *  3/2016  Morley ................. G06F 11/079
9,652,471 B1 *  5/2017  Krishnan .............. G06F 3/0643
10,228,959 B1 * 3/2019  Anderson .............. G06F 9/546
(Continued)

FOREIGN PATENT DOCUMENTS

JP   2019-057167 A   4/2019

OTHER PUBLICATIONS

International Search Report for PCT Application No. PCT/JP2020/025306, mailed on Oct. 6, 2020.

*Primary Examiner* — Elmira Mehrmanesh

(57) ABSTRACT

The communication terminal detect a functional module of anomalous operating state, and to notify the edge server of the anomalous operating state. The edge server generates respective disk images corresponding to the functional module and a related functional module, generates a plurality of divided disk images obtained by dividing the generated disk image, and sends the plurality of divided disk images to the storage device. The storage device stores the divided disk images, and sends divided disk images corresponding to the functional module and the related functional module to the communication terminal in response to request from the communication terminal. The communication terminal generates the disk image by coupling the plurality of divided disk images acquired from the storage device, and turns on the functional module and the related functional module based on the generated disk image.

12 Claims, 16 Drawing Sheets

(56) References Cited

U.S. PATENT DOCUMENTS

| | | | |
|---|---|---|---|
| 2005/0005000 A1* | 1/2005 | Yoshimoto | H04N 21/24 348/E5.008 |
| 2008/0215796 A1* | 9/2008 | Lam | G06F 9/44505 714/E11.12 |
| 2011/0173334 A1* | 7/2011 | Shah | H04L 67/288 709/228 |
| 2014/0095817 A1* | 4/2014 | Hsu | G06F 3/065 711/162 |
| 2014/0181397 A1* | 6/2014 | Bonzini | G06F 16/27 711/112 |
| 2015/0227550 A1* | 8/2015 | Matsuki | H04L 67/1097 707/827 |
| 2015/0355961 A1* | 12/2015 | Lesartre | G06F 11/0781 714/57 |
| 2017/0308547 A1* | 10/2017 | Gupta | G06F 16/182 |
| 2017/0364406 A1* | 12/2017 | Kumar | G06F 11/079 |
| 2018/0278724 A1* | 9/2018 | Erdelyi | H04L 67/02 |
| 2019/0319974 A1* | 10/2019 | Hasumi | H04L 45/121 |
| 2021/0044646 A1* | 2/2021 | Guim Bernat | G06F 9/45558 |
| 2023/0007857 A1* | 1/2023 | Yang | G06F 11/079 |

* cited by examiner

| TERMINAL ID | TERMINAL TYPE |
|---|---|
| e001 | EDGE SERVER |
| s001 | STORAGE DEVICE |
| s002 | STORAGE DEVICE |
| d001 | COMMUNICATION TERMINAL |
| d002 | COMMUNICATION TERMINAL |
| ⋮ | ⋮ |

Fig. 7A

| TERMINAL ID OF COMMUNICATION TERMINAL ITSELF |
|---|
| d001 |

Fig. 7B

| SENDING DESTINATION TERMINAL ID | TERMINAL ID OF NEXT TRANSFER DESTINATION |
|---|---|
| s001 | d001 |
| s002 | d002 |
| e001 | d002 |
| ⋮ | ⋮ |

Fig. 7C

| MODULE ID | MODULE VERSION | NUMBER OF DIVISIONS |
|---|---|---|
| login | 3.8.5 | 128 |
| camera | 2.4.3 | 36 |
| detect-person | 0.1.1 | 521 |
| ... | ... | ... |

Fig. 8A

| MODULE ID | MODULE VERSION | COOPERATIVE MODULE ID | COOPERATIVE MODULE VERSION |
|---|---|---|---|
| camera | 2.4.3 | detect-person | 0.1.1 |
| camera | 2.4.3 | login | 3.8.5 |
| ... | ... | ... | ... |

Fig. 8B

| MODULE ID | MODULE VERSION | POLICY TYPE | VALUE |
|---|---|---|---|
| login | 3.8.5 | valid_account | userA |
| login | 3.8.5 | login_from | 192.168.24.0/24 |
| camera | 2.4.3 | ave_trans_rate | 3Mbps |
| detect-person | 0.1.1 | file_hash | /etc/conf, 79a9e9766e8007d6c341c7e238045ae5 |
| ... | ... | ... | ... |

Fig. 9

| MODULE ID | MODULE VERSION | FRAGMENT NUMBER |
|---|---|---|
| login | 3.8.5 | 1 |
| login | 3.8.5 | 2 |
| login | 3.8.5 | 3 |
| ... | ... | ... |
| camera | 2.4.3 | 1 |
| camera | 2.4.3 | 2 |
| ... | ... | ... |

Fig. 10

| RECEPTION DATE AND TIME | TRANSMISSION SOURCE TERMINAL ID | MODULE ID | MODULE VERSION | VIOLATED POLICY TYPE | LOG |
|---|---|---|---|---|---|
| 2020/01/24 02:08:32+09:00 | d001 | login | 3.8.5 | valid_account | "login trial was detected to invalid account 'userC'" |
| 2020/01/24 02:08:34+09:00 | d001 | login | 3.8.5 | login_from | "login trial successed from '192.168.33.24' to 'userA'" |
| ... | ... | ... | ... | ... | ... |

Fig. 13

| MODULE ID | CORRESPONDING VERSION | VIOLATED POLICY TYPE | HANDLING METHOD |
|---|---|---|---|
| login | >=3.8.0 | valid_account | PERFORM NOTHING |
| login | >=1.0.0 | login_from | INVALIDATE ACCOUNT THAT HAS SUCCESSFULLY LOGGED IN |
| ... | ... | ... | ... |

Fig. 14

TURN ON FUNCTIONAL MODULE AND RELATED FUNCTIONAL MODULE BASED ON GENERATED DISK IMAGE

This application is a National Stage Entry of PCT/JP2020/025306 filed on Jun. 26, 2020, the contents of all of which are incorporated herein by reference, in their entirety.

TECHNICAL FIELD

The present invention relates to a distributed system, a communication terminal, a function recovery method, and a program that can recover a function of the communication terminal of anomalous operating state.

BACKGROUND ART

Recently, distributed systems such as Internet of Things (IoT) and cyber physical systems have been increasingly implemented in society. In a distributed system, a number of communication terminals are configured to be connected with other terminals in the same distributed system via a wired or wireless network. In general, a communication terminal that configure a distributed system has only the minimum computational resources and storage from a viewpoint of cost and other factors. The communication terminal only has low-speed communication paths even for connection with the Internet and cloud servers or only performs communication with a particular terminal (for example, an edge server or the like) in the distributed system.

When such a communication terminal is in an operating state not intended in terms of design or operation, due to an attack from an outside of the distributed system (for example, when the communication terminal is infected with bot or is under the control of an attacker), an operator need exclude the communication terminal from the distributed system and instead place an alternative communication terminal to provide a normal function. If a communication terminal is located in a public space and the outage of the communication terminal has a significant social and cost impact, the provision of normal functions of the communication terminal must be resumed as soon as possible.

PTL 1 describes that, when an IoT device is attacked, for example, hacked, and a malicious application or a malicious file is introduced to a region of the device, the region is restarted and the malicious application or the malicious file is deleted, to recover the region.

BranchCache (registered trademark) of Microsoft Corporation relates to distributed cache of files. With this technique, once a device obtains content from a server, a neighboring device can also obtain the content obtained by the device, from the device, which can reduce a network band.

CITATION LIST

Patent Literature

[PTL 1] JP 2019-057167 A

SUMMARY

Technical Problem

However, it is difficult for an operator to promptly recover a function in a distributed system, due to factors such as an increase in the number of terminals, physical distances, and communication bands. Even PTL 1 above does not mention such a problem.

An example object of the present invention is to provide a distributed system, a communication terminal, a function recovery method, and a program that enable prompt function recovery when a communication terminal that configure the distributed system is in a state of operation that differs from that intended by design or operation.

Solution to Problem

According to a first example aspect of the present invention, provided is a distributed system in which one or more communication terminals including: one or more storage devices, and an edge server communicate via a network, wherein the communication terminal is configured to detect a functional module of anomalous operating state, and to notify the edge server of the anomalous operating state; the edge server is configured to generate respective disk images corresponding to the functional module and a related functional module, to generate a plurality of divided disk images obtained by dividing the generated disk image, and to send the plurality of divided disk images to the storage device; the storage device is configured to store the divided disk images, and to send divided disk images corresponding to the functional module and the related functional module to the communication terminal in response to request from the communication terminal; and the communication terminal is configured to generate the disk image by coupling the plurality of divided disk images acquired from the storage device, and to turn on the functional module and the related functional module based on the generated disk image.

According to a second example aspect of the present invention, provided is a communication terminal configuring a distributed system including: a module diagnosing means configured to diagnose operating states of a plurality of functional modules, and to detect a functional module of anomalous operating state; a module discarding means configured to stop the functional module of the anomalous operating state, and to discard the functional module; a divided disk image coupling means configured to acquire a plurality of divided disk images obtained by dividing a disk image corresponding to the functional module and generated to resolve the anomalous operating state, and to couple the plurality of divided disk images; and a module turning-on means configured to turn on the functional module, based on a disk image generated by coupling the plurality of divided disk images.

According to a third example aspect of the present invention, provided is a function recovery method for a distributed system in which one or more communication terminals, one or more storage devices, and an edge server communicate via a network, the function recovery method including: a notification step of the communication terminal detecting a functional module of anomalous operating state, and notifying the edge server of the anomalous operating state; a first sending step of the edge server generating respective disk images corresponding to the functional module and a related functional module, generating a plurality of divided disk images obtained by dividing the generated disk image, and sending the plurality of divided disk images to the storage device; a second sending step of the storage device storing the divided disk images, and sending divided disk images corresponding to the functional module and the related functional module to the communication terminal in response to request from the communication terminal; and a turning-on step of the communication terminal generating the disk image by coupling the plurality of divided disk images acquired from the storage device, and turning on the functional module and the related functional module based on the generated disk image.

According to a fourth example aspect of the present invention, provided is a program for causing a computer including: function as the communication terminal according to the second perspective of the present invention.

Advantageous Effects of Invention

According to each of example aspect of the present invention, the distributed system, the communication terminal, the function recovery method, and the program that enable prompt function recovery when the communication terminal that configure the distributed system is in a state of operation that differs from that intended by design or operation. Note that, according to the present invention, instead of or together with the above effects, other effects may be exerted.

BRIEF DESCRIPTION OF THE DRAWINGS

FIGS. 7A to 7C are diagrams illustrating an example of system information according to the first example embodiment;

FIGS. 8A and 8B are diagrams illustrating an example of the system information according to the first example embodiment;

FIG. 9 is a diagram illustrating an example of the system information according to the first example embodiment;

FIG. 10 is a diagram illustrating an example of divided disk image information according to the first example embodiment;

FIG. 13 is a diagram illustrating an example of an incident report according to the first example embodiment;

FIG. 14 is a diagram illustrating an example of an update policy according to the first example embodiment;

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Figure 1:
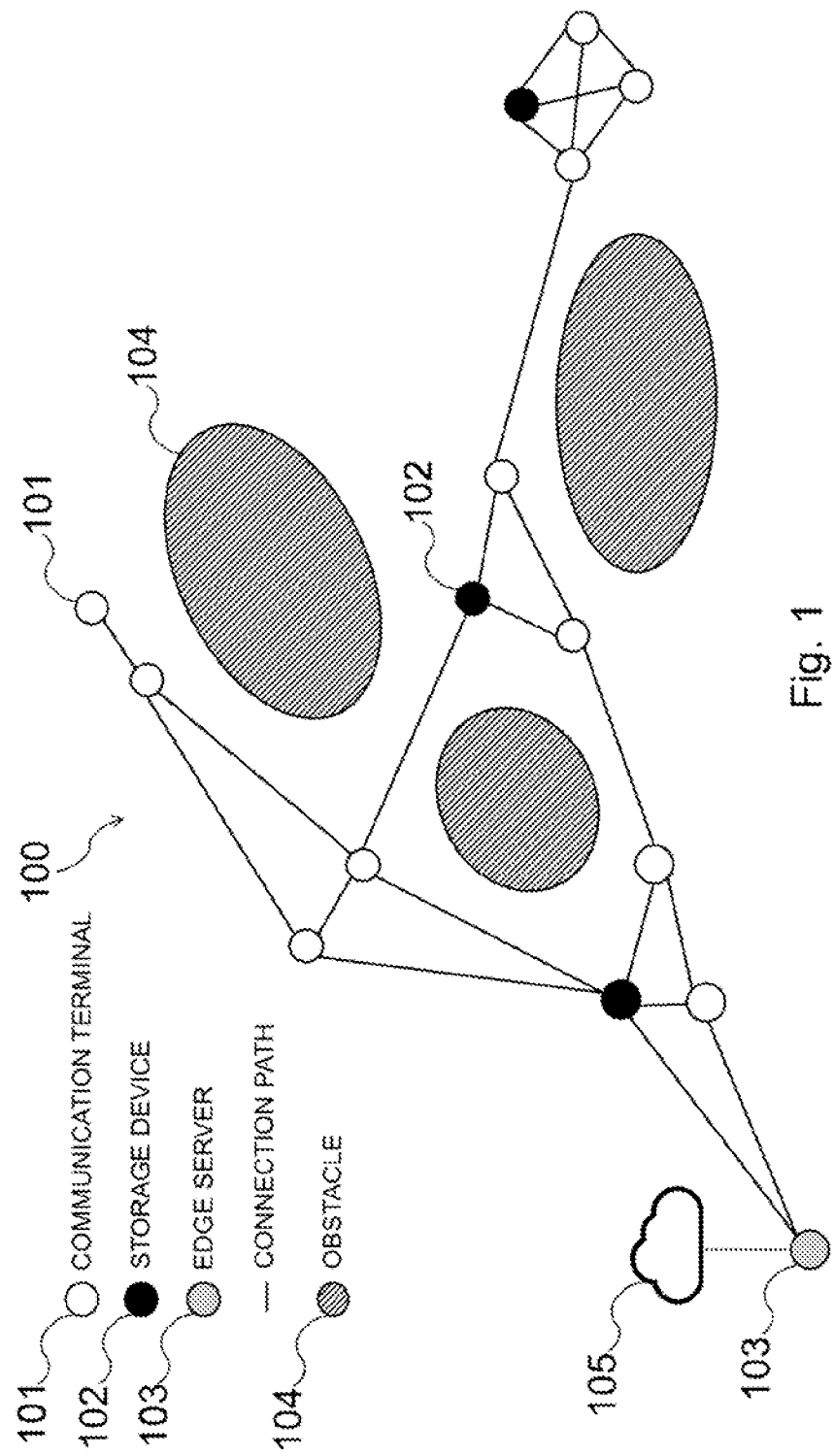
FIG. 1 is a schematic diagram of a distributed system according to a first example embodiment.

Descriptions will be given in the following order.
1. First Example Embodiment
   1.1. Configuration of System
   1.2. Configuration of Communication Terminal
   1.3. Configuration of Storage Device
   1.4. Configuration of Edge Server
   1.5. Operation Example of Communication Terminal
   1.6. Operation Example of Storage Device
   1.7. Operation Example of Edge Server
   1.8. Hardware Configuration
   1.9. Technical Features
2. Second Example Embodiment
   2.1. Configuration of System
   2.2. Operation Example 1. First Example Embodiment 1.1. Configuration of System FIG. 1 is a schematic diagram of a distributed system according to a first example embodiment.

A distributed system 100 includes one or more communication terminals 101, one or more storage devices 102, and one or more edge servers 103. Solid lines in FIG. 1 illustrate connection paths, and the communication terminals 101, the storage devices 102, and the edge servers 103 are communicably connected to each other via a wired or wireless network as illustrated by the solid lines in FIG. 1. One or more obstacles 104 may be present between the communication terminals 101, the storage devices 102, and the edge servers 103. The edge servers 103 may each be connected to a cloud server 105, which provides cloud computing as well. The distributed system may be a cyber physical system. The communication terminals 101 may each be a terminal including a sensor and the like and configuring IoT. The edge servers 103 can each provide, near the communication terminals 101 that generate data, edge computing that enables processing of the generated data. The number of communication terminals 101, the number of storage devices 102, and the number of edge servers 103 are not limited to those illustrated in FIG. 1. Details of each of the constituent elements will be described later.

1.2. Configuration of Communication Terminal

Figure 2:
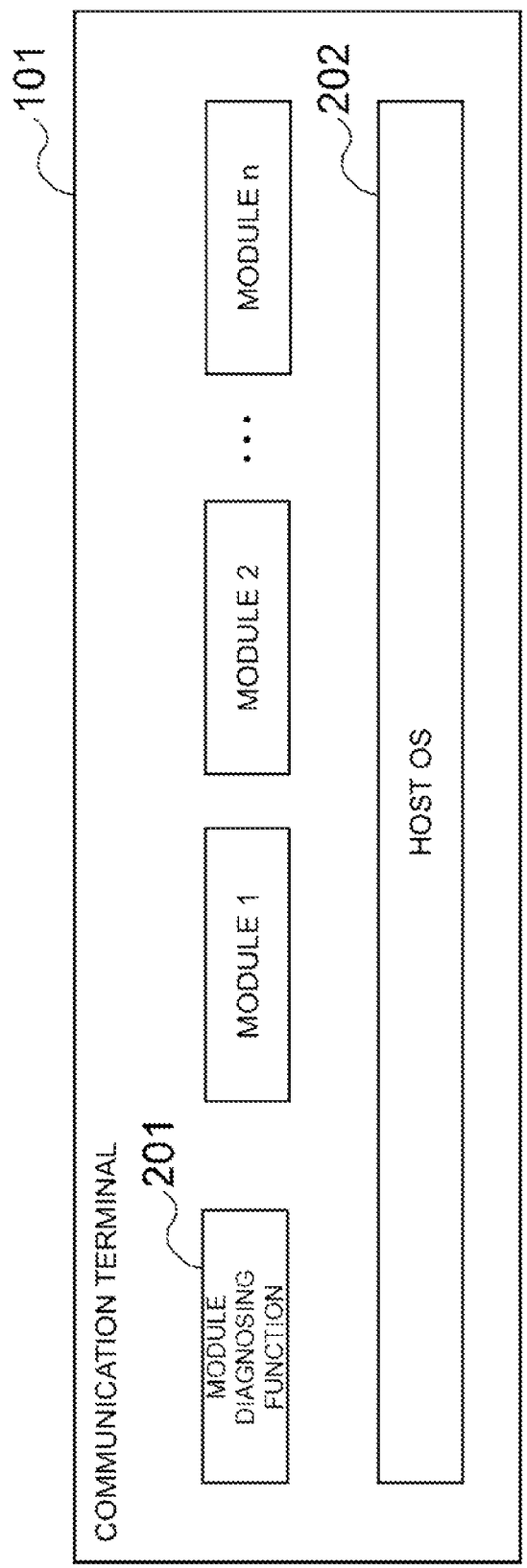
FIG. 2 is a diagram of a module configuration of a communication terminal according to the first example embodiment.

FIG. 2 is a diagram of a module configuration of the communication terminal 101 according to the first example embodiment. A module indicates a part implemented with software, hardware, or a combination of these capable of logically separating functions of the communication terminal 101. The module is also referred to as a functional module.

As illustrated in FIG. 2, the communication terminal 101 includes one or more modules 1 to n. The communication terminal 101 can diagnose, by a module diagnosing function 201 of a host OS 202, an operating state of each of the one or more modules 1 to n. Concretely, the module diagnosing function 201 can determine, for each of the one or more modules 1 to n, whether the module is in an operating state different from what is intended in terms of design or operation (also referred to as an anomalous operating state below), based on system information to be described later.

Figure 3:
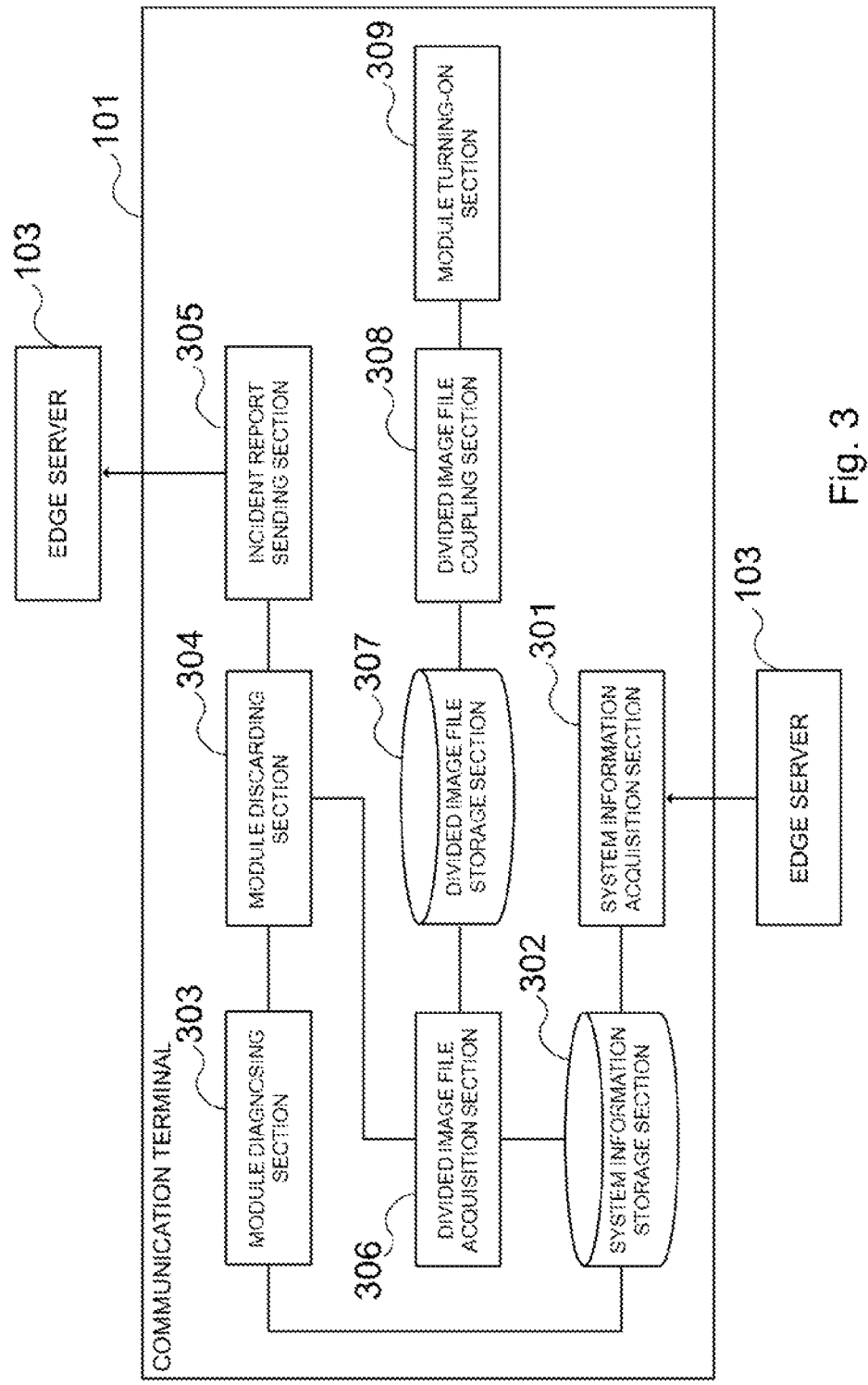
FIG. 3 is a diagram of a functional configuration of the communication terminal according to the first example embodiment.

FIG. 3 is a diagram of a functional configuration of the communication terminal 101 according to the first example embodiment. As illustrated in FIG. 3, the communication terminal 101 includes a system information acquisition section 301, a system information storage section 302, a module diagnosing section 303, a module discarding section 304, an incident report sending section 305, a divided disk image acquisition section 306, a divided disk image storage section 307, a divided disk image coupling section 308, and a module turning-on section 309.

The system information acquisition section 301 acquires system information related to the distributed system 100, from the edge server 103.

The system information storage section 302 retains system information related to the distributed system 100 and acquired by the system information acquisition section 301.

The module diagnosing section 303 diagnoses an operating state of each module operating in the communication terminal 101, based on the system information retained in the system information storage section 302, and detects a module of anomalous operating state.

The module discarding section 304 discards the module(s) of the anomalous operating state(s) detected by the module diagnosing section 303. Discarding means deletion from the communication terminal 101. The module discarding section 304 deletes a target module from the communication terminal 101 along with the data used by the module. A module to be discarded is not only a module of anomalous operating state but also includes a related module related to the module (also referred to as a related functional module).

The incident report sending section 305 sends an incident report with incident information indicating the contents of an anomalous state, including the name, version, violation policy type, and log of the module in the anomalous operating state, to the edge server 103. The incident report is used to make a notification of the anomalous operating state of the module. Note that an incident indicates an event possibly being a threat in terms of security.

The divided disk image acquisition section 306 acquires divided disk images obtained by dividing an updated disk image corresponding to the target module, from the storage device(s) 102. The divided disk image acquisition section 306 may acquire the divided disk images from one or more storage devices 102 neighboring on the communication terminal 101. The one or more neighboring storage devices 102 may be one or more storage devices 102 capable of directly establishing a communication link(s) with the communication terminal 101. Alternatively, the one or more neighboring storage devices 102 may be determined according to the number of hops to the communication terminal 101. For example, by determining whether the number of hops to the communication terminal 101 is equal to or smaller than a predetermined number of hops, a target storage device(s) 102 may be determined. The number of hops indicates the number of intermediate devices to be passed between a transmission destination and a transmission source. The divided disk image acquisition section 306 may download a plurality of divided disk images in parallel.

The divided disk image storage section 307 retains the divided disk images acquired by the divided disk image acquisition section 306.

The divided disk image coupling section 308 acquires the divided disk images from the divided disk image storage section 307 and couples divided disk images for a disk image for which all divided disk images are acquired, to thereby generate a disk image.

The module turning-on section 309 turns on a module, based on the disk image generated by the divided disk image coupling section 308.

Note that the communication terminal 101 may further include constituent elements other than these constituent elements. In other words, the communication terminal 101 may also perform operations other than the operations of these constituent elements. For example, the communication terminal 101 may include an unillustrated sensor, to be configured to send data acquired by the sensor to the edge server 103 or the cloud server 105. Although two edge servers 103 are illustrated in FIG. 3, the edge servers 103 may be configured as the same server.

1.3. Configuration of Storage Device

Figure 4:
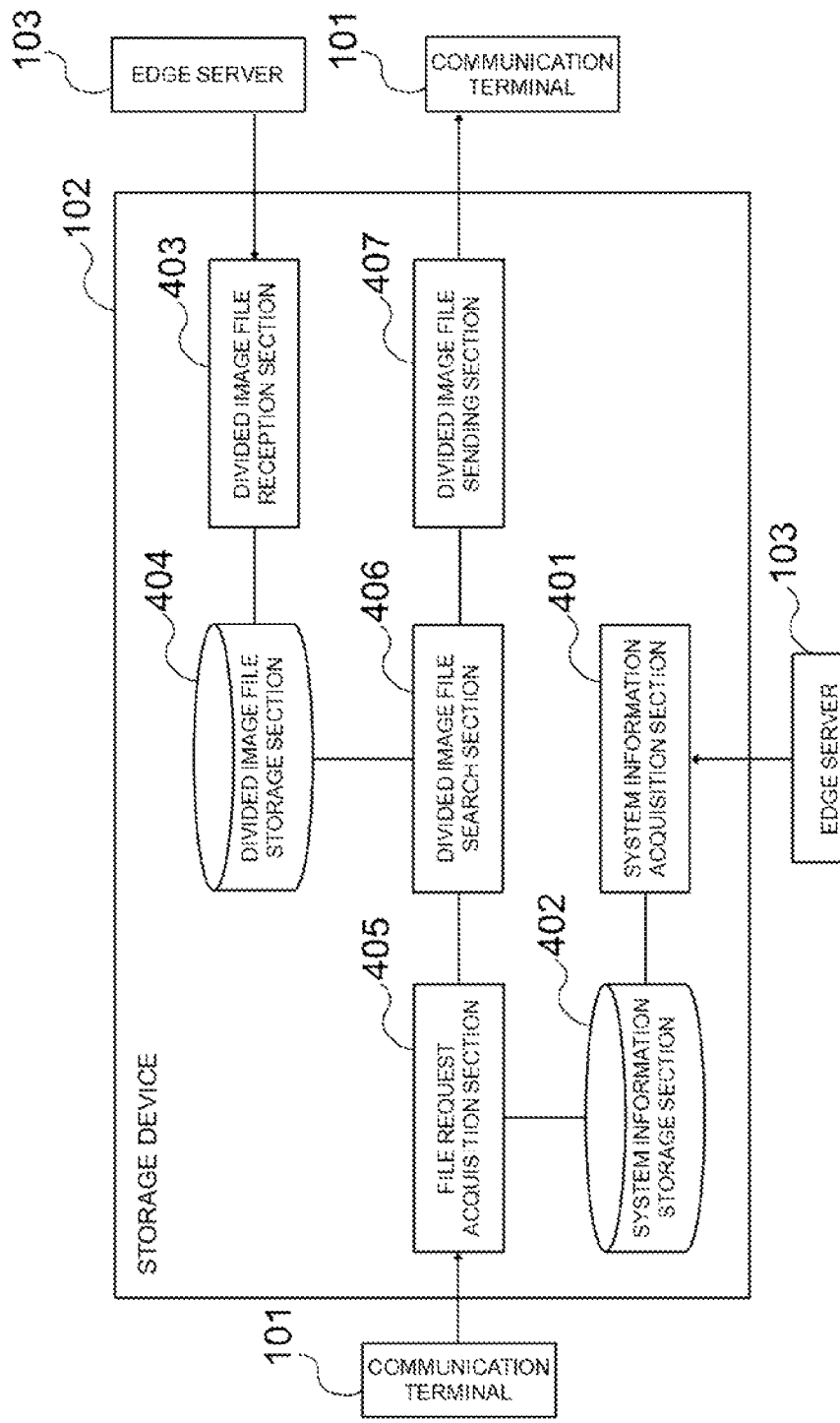
FIG. 4 is a diagram of a functional configuration of a storage device according to the first example embodiment.

FIG. 4 is a diagram of a functional configuration of the storage device 102 according to the first example embodiment. As illustrated in FIG. 4, the storage device 102 includes a system information acquisition section 401, a system information storage section 402, a divided disk image reception section 403, a divided disk image storage section 404, a file request acquisition section 405, a divided disk image search section 406, and a divided disk image sending section 407. The storage device 102 is a device provided to retain divided disk images in the distributed system 100. Since the communication terminals 101 do not generally have resources sufficient to retain a number of divided disk images, the distributed system 100 of the present example embodiment is configured to be able to retain a number of divided disk images by the storage device 102. The storage device 102 may retain divided disk images for a plurality of communication terminals 101.

The system information acquisition section 401 acquires system information related to the distributed system 100, from the edge server 103.

The system information storage section 402 retains system information related to the distributed system 100 and acquired by the system information acquisition section 401.

The divided disk image reception section 403 receives divided disk images obtained by dividing an updated disk image, from the edge server 103.

The divided disk image storage section 404 retains the divided disk images received by the divided disk image reception section 403. The divided disk image storage section 404 may update, using newly received divided disk images, existing divided disk images corresponding to the newly received divided disk images.

The file request acquisition section 405 receives request to acquire a divided disk image, from the communication terminal 101.

The divided disk image search section 406 searches the one or more divided disk images retained by the divided disk image storage section 404 for the divided disk image corresponding to the file request from the communication terminal 101 and extracts the divided disk image.

The divided disk image sending section 407 receives the divided disk image extracted by the divided disk image search section 406 and sends the received divided disk image to the communication terminal 101.

Note that, although two communication terminals 101 and two edge servers 103 are illustrated in FIG. 4, the communication terminals 101 may be configured as the same terminal, and the edge servers 103 may be configured as the same server.

1.4. Configuration of Edge Server

Figure 5:
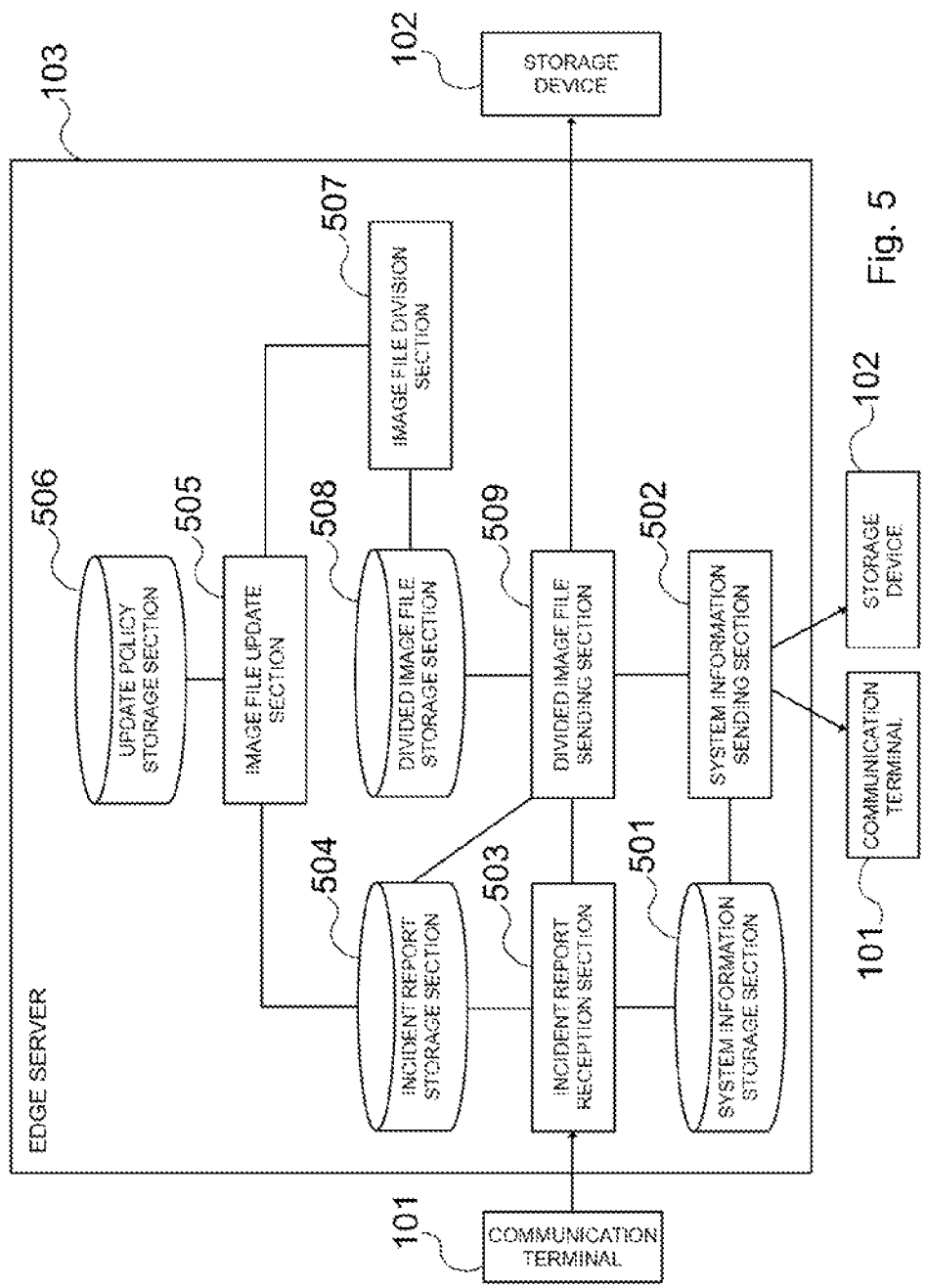
FIG. 5 is a diagram of a functional configuration of an edge server according to the first example embodiment.

FIG. 5 is a diagram of a functional configuration of the edge server 103 according to the first example embodiment.

As illustrated in FIG. 5, the edge server 103 includes a system information storage section 501, a system information sending section 502, an incident report reception section 503, an incident report storage section 504, a disk image update section 505, an update policy storage section 506, a disk image division section 507, a divided disk image storage section 508, and a divided disk image sending section 509.

The system information storage section 501 retains system information related to the distributed system 100.

The system information sending section 502 sends the system information retained by the system information storage section 501 to the communication terminal 101 and the storage device 102.

The incident report reception section 503 receives an incident report from the communication terminal 101.

The incident report storage section 504 retains the incident report received by the incident report reception section 503.

The disk image update section 505 updates a disk image for each target module in accordance with an update policy retained by the update policy storage section 506. Alternatively, the disk image update section 505 updates a disk image in accordance with an indication from an operator.

The update policy storage section 506 retains update policy information for each module, which indicates the action to be taken when the module is determined to be in an anomalous operating state. The handling method includes, for example, a method of updating a disk image corresponding to a violated policy type of each module. Details of the update policy will be described later.

The disk image division section 507 divides the updated disk image in accordance with a predetermined method defined in advance. A method of dividing a disk image will be described later.

The divided disk image storage section 508 retains divided disk images acquired from the disk image division section 507.

The divided disk image sending section 509 sends the divided disk images to the storage device 102. The destination storage device 102 may be a plurality of storage devices included in a group configured in advance. In this case, the divided disk images are sent so that the disk image can be reproduced using the divided disk images sent to the plurality of storage devices in the group.

Note that, although two communication terminals 101 and two storage devices 102 are illustrated in FIG. 5, the communication terminals 101 may be configured as the same terminal, and the storage devices 102 may be configured as the same device.

1.5. Operation Example of Communication Terminal

Figure 6:
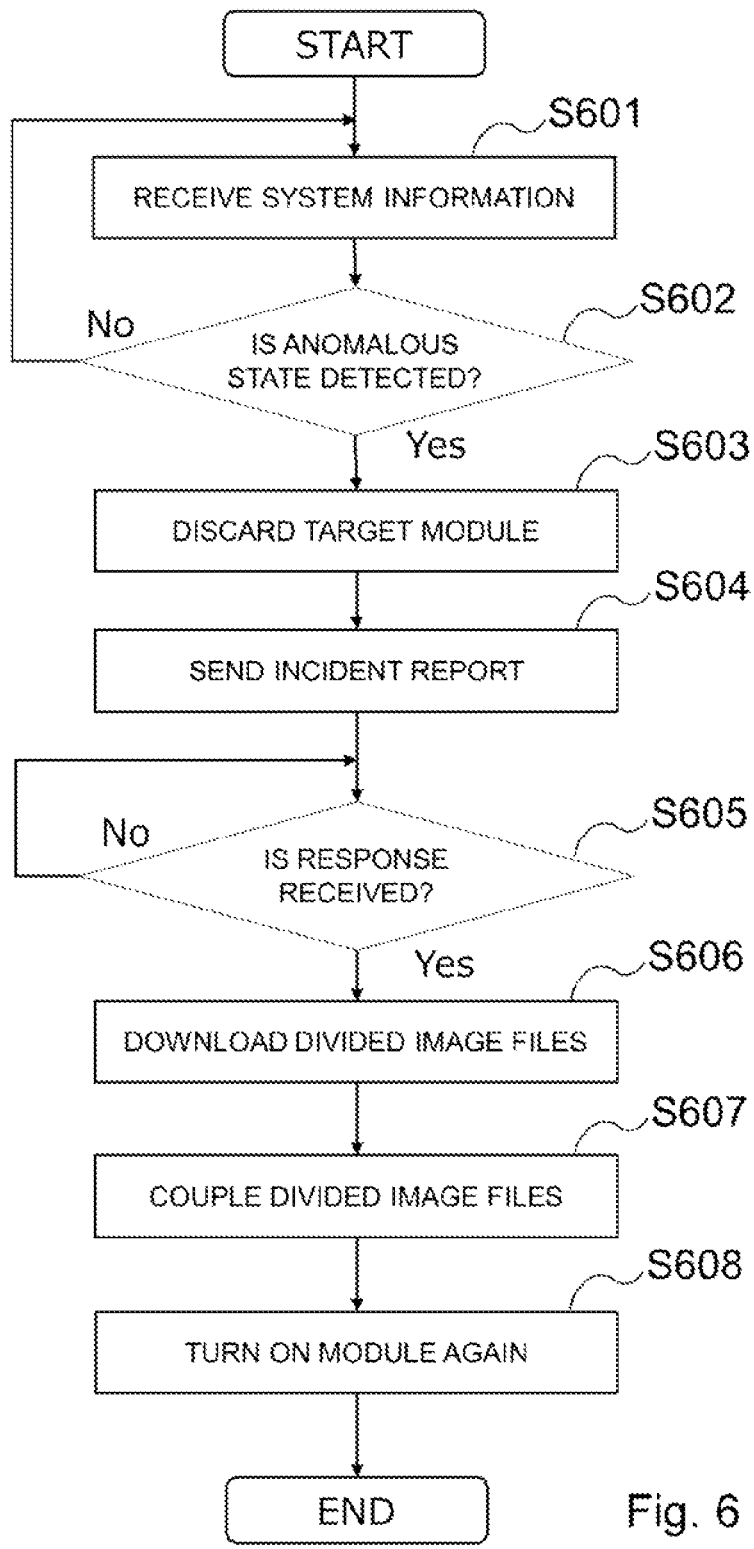
FIG. 6 is a flowchart illustrating an operation example of the communication terminal according to the first example embodiment.

FIG. 6 is a flowchart illustrating an operation example of the communication terminal according to the first example embodiment. Note that detailed descriptions of matters that have already been described are omitted in the following description.

First, in S601, the system information acquisition section 301 receives system information from the edge server 103. The system information acquisition section 301 stores the received system information in the system information storage section 302.

In S602, the module diagnosis section 303 determines whether each module in the distributed system 100 is in an anomalous operating state, based on the system information stored in the system information storage section 302. When the anomalous operating state is detected, the processing advances to S603. In contrast, when the anomalous operating state is not detected, the processing returns to S601 and is repeated.

In S603, the module discarding section 304 discards the module for which the anomalous operating state is detected and a related module of the module.

In S604, the incident report sending section 305 sends an incident report related to the module for which the anomalous operating state is detected, to the edge server 103.

In S605, the communication terminal 101 determines whether a response to the incident report is received from the edge server 103. The communication terminal 101 stands by until the communication terminal 101 receives the response from the edge server 103. When the communication terminal 101 receives the response, the processing advances to S606.

In S606, the communication terminal 101 downloads divided disk images corresponding to the discarded module, from the storage device 102 and stores the divided disk images in the divided disk image storage section 307.

Is S607, the divided disk image coupling section 308 couples the divided disk images acquired from the divided disk image storage section 307 to generate a single disk image for each module.

In S608, the module turning-on section 309 turns on the module again, based on the generated disk image.

As described above, the communication terminal 101 can promptly recover a function even in an anomalous operating state.

FIGS. 7A to 7C are diagrams illustrating an example of the system information according to the first example embodiment. The system information illustrated in FIGS. 7A to 7C is an example of system information retained in the system information storage section 302 by the communication terminal 101.

FIG. 7A illustrates a relationship between a terminal ID (identifier) and a terminal type 702. For example, a terminal having a terminal ID "e001" is the edge server 103. Terminals having terminal IDs "s001" and "s002" are the storage devices 102. Terminals having terminal IDs "d001" and "d002" are the communication terminals 101.

FIG. 7B illustrates its own terminal ID. The example illustrated in FIG. 7B illustrates that its own terminal ID is "d001."

FIG. 7C illustrates a relationship between a transmission destination terminal ID and a terminal ID of next transfer destination. For example, when the transmission destination terminal ID is "s001," the terminal ID of the next transfer destination is "d001." When the transmission destination terminal ID is "s002," the terminal ID of the next transfer destination is "d002." When the transmission destination terminal ID is "e001," the terminal ID of the next transfer destination is "d002."

FIGS. 8A and 8B are also diagrams illustrating an example of the system information according to the first example embodiment. The system information illustrated in FIGS. 8A and 8B is also an example of the system information retained in the system information storage section 302 by the communication terminal 101.

FIG. 8A illustrates a list of modules that the terminal should have. For example, the communication terminal 101 having the list of modules illustrated in FIG. 8A includes a "login" module of a module version "3.8.5," and the disk image of the module is divided into 128 pieces. This communication terminal 101 includes a "camera" module of a module version "2.4.3," and the disk image of the module is divided into 36 pieces. This communication terminal 101 includes a "detect-person" module of a module version "0.1.1," and the disk image of the module is divided into 521 pieces.

FIG. 8B illustrates a list of cooperative modules. For example, the "camera" module having a module version "2.4.3" cooperates with a "detect-person" module having a module version "0.1.1." This "camera" module also cooperates with the "login" module having a module version "3.8.5." The cooperative modules are also referred to as related modules.

FIG. 9 also illustrates an example of the system information according to the first example embodiment. The system information illustrated in FIG. 9 is also an example of the system information retained in the system information storage section 302 by the communication terminal 101.

More concretely, FIG. 9 illustrates a rule for determining an anomalous operation of each module. Here, the rule is expressed by a policy type and a value of the policy type.

For example, a policy type "valid account" is applied to "login" module having a module version "3.8.5," and the value of the policy type is "userA." This indicates that a valid account for the use of the module is "userA." To this module, a policy type "login_from" is applied, and the value of the policy type is "192.168.24.0/24." This indicates that, when the IP address of an apparatus to log in the module is within a range from 192.168.24.0 to 24, the state is normal.

A policy type "ave_trans_rate" is applied to the "camera" module having a module version "2.4.3," and the value of the policy type is "3 Mbps." This indicates that, when the average communication rate of data sent from the module is 3 Mbps (bits per second) or lower, the state is normal.

A policy type "file_hash" is applied to the "detect-person" module having a module version "0.1.1," and the value of the policy type is "/etc/conf, 79a9e9766e8007d6c341c7e238045ae5." This indicates that, when the hash value of a file existing in a specified directory is a specified value, the state is normal.

Here, an operation example of the module diagnosing section 303 of the communication terminal 101 will be described in more detail.

The module diagnosing section 303 detects excess/deficiency of modules and an operating state violating a policy of each module, based on the list of modules that the communication terminal 101 is to include (refer to FIG. 8A), the list being stored in the system information storage section 302.

The policy of each module is defined by a policy type and a value for each module as illustrated in FIG. 9. For example, when a policy type is "valid_account," the value indicates an account name "userA" with which log-in to the module is possible. When a policy type is "login_from," the value indicates a network segment "192.168.24.0/24" with which log-in to the module is possible. When a policy type is "ave_trans_rate," the value indicates "3 Mbps," which is the average bit rate of network communication generated by the module. When a policy type is "file_hash," the value indicates a hash value "/etc/conf, 79a9e9766e8007d6c341c7e238045ae5" of a specific file in the module.

As described above, when the module diagnosing section 303 detects an operating state that violates a policy defined in advance for each module, it determines that the module is in an operating state not intended in terms of design or operation such as a cyber-attack. In this way, the module diagnosing section 303 detects an anomalous operation of each module.

Next, an operation example of the module discarding section 304 of the communication terminal 101 will be described in more detail.

The module discarding section 304 stops the operation of the module determined by the module diagnosing section 303 that the module is in an anomalous operating state and discards data together with the module. For example, the module discarding section 304 stops a container corresponding to the module and discards the container itself In discarding the module, the module discarding section 304 also refers to the cooperative module information (FIG. 8B) retained by the system information storage section 302 and also includes cooperative modules as discarding targets recursively. By also discarding the cooperative modules, other modules that share files or exchange configuration files and information with a module in an anomalous state can also be discarded together.

FIG. 10 illustrates an example of divided disk image information according to the first example embodiment. The divided disk image information indicates information of divided disk images retained by the divided disk image storage section 307 of the communication terminal 101 and stored in the divided disk image storage section 307.

The divided disk image information illustrated in FIG. 10 indicates that, for the "login" module having a module version "3.8.5," divided disk images having fragment numbers 1, 2, 3, . . . are stored. The divided disk image information also indicates that, for the "camera" module having a module version "2.4.3," divided disk images having fragment numbers 1, 2, . . . are stored. Each fragment number indicates the number of divisions of a disk image.

1.6. Operation Example of Storage Device

Figure 11:
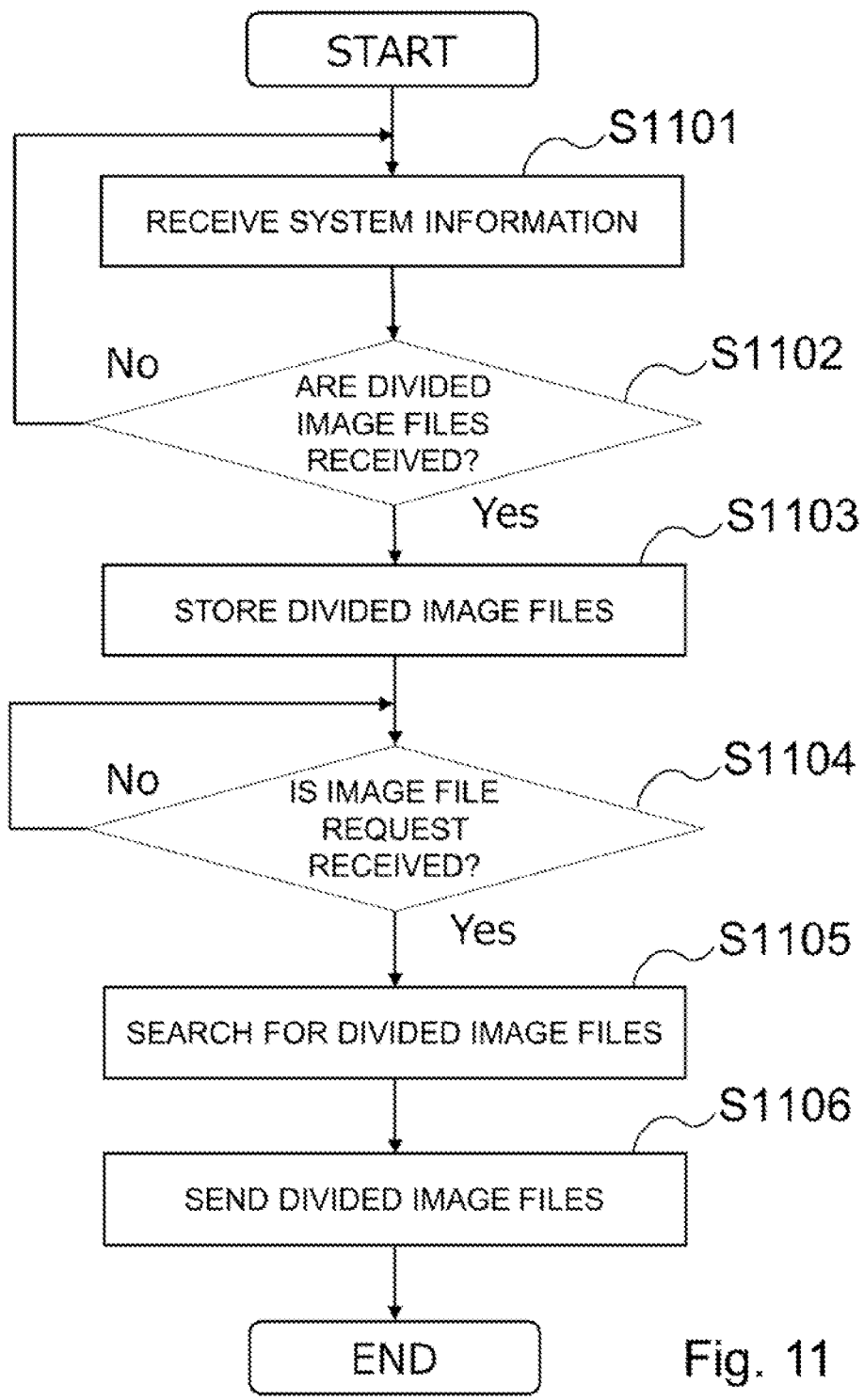
FIG. 11 is a flowchart illustrating an operation example of the storage device according to the first example embodiment.

FIG. 11 is a flowchart illustrating an operation example of the storage device according to the first example embodiment. Note that detailed descriptions of matters that have already been described are omitted in the following description.

First, in S1101, the system information acquisition section 401 receives system information from the edge server 103. The system information acquisition section 401 stores the received system information in the system information storage section 402.

In S1102, the divided disk image reception section 403 determines whether divided disk images are received from the edge server 103. The divided disk image reception section 403 stands by until divided disk images are received, and when the divided disk image reception section 403 receives divided disk images, the processing advances to S1103.

In S1103, the divided disk image reception section 403 stores the received divided disk images in the divided disk image storage section 404.

Subsequently, in S1104, the file request acquisition section 405 determines whether disk image request is received from the communication terminal 101. The file request acquisition section 405 stands by until the disk image request is received, and when the file request acquisition section 405 receives the disk image request, the processing advances to S1105.

In S1105, the divided disk image search section 406 searches the divided disk image storage section 404 for divided disk images corresponding to the disk image request.

In S1106, the divided disk image sending section 407 sends the searched-out divided disk images to the communication terminal 101.

As described above, the storage device 102 receives the divided disk images from the edge server 103 and retains the received divided disk images. The storage device 102 sends the divided disk images in response to request from the communication terminal 101.

1.7. Operation Example of Edge Server

Figure 12:
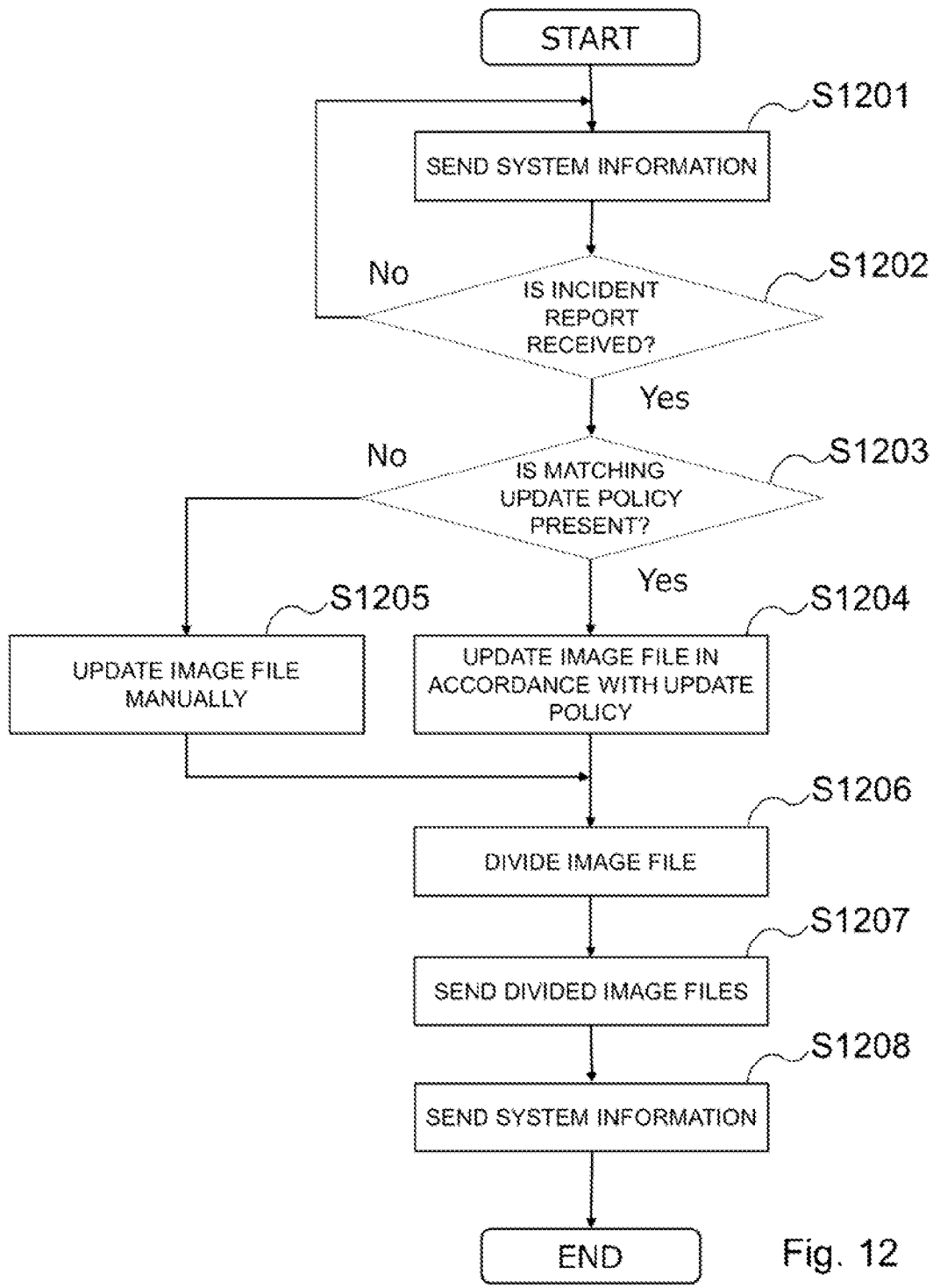
FIG. 12 is a flowchart illustrating an operation example of the edge server according to the first example embodiment.

FIG. 12 is a flowchart illustrating an operation example of the edge server according to the first example embodiment. Note that detailed descriptions of matters that have already been described are omitted in the following description.

First, in S1201, the system information sending section 502 sends system information retained by the system information storage section 501 to the communication terminal 101 and the storage device 102.

Subsequently, in S1202, the incident report reception section 503 determines whether an incident report is received from the communication terminal 101. The incident report reception section 503 stands by until the incident report is received, and, when the incident report reception section 503 receives the incident report, the processing advances to S1203.

In S1203, the disk image update section 505 determines whether an update policy matching content of the received incident report is present in the update policy storage section 506. When the update policy is present, the processing advances to S1204, and the disk image update section 505 updates a corresponding disk image in accordance with the update policy. In contrast, when the update policy is not present, the processing advances to S1205, and an operator manually updates the disk image.

Subsequently, in S1206, the disk image division section 507 divides the updated disk image to thereby generate divided disk images. The divided disk images are stored in the divided disk image storage section 508.

In S1207, the divided disk image sending section 509 sends the divided disk images to the storage device 102.

In S1208, the system information sending section 502 sends system information to the communication terminal 101.

As described above, when the edge server 103 receives the incident report from the communication terminal 101, the edge server 103 updates the disk image of a target module in accordance with the update policy. The edge server 103 divides the updated disk image to thereby generate divided disk images and sends the generated divided disk images to the storage device 102.

Next, an operation example of the disk image update section 505 will be described in more detail with reference to FIG. 13 and FIG. 14.

FIG. 13 is a diagram illustrating an example of an incident report according to the first example embodiment. The incident report illustrated in FIG. 13 is an example of an incident report retained by the edge server 103 in the incident report storage section 504. As illustrated in FIG. 13, the incident report includes a reception date and time, a sending source terminal ID, a module ID, a module version, a violated policy type, and a log.

FIG. 14 is a diagram illustrating an example of an update policy according to the first example embodiment. The update policy illustrated in FIG. 14 is an example of an update policy retained in the update policy storage section 506 by the edge server 103. As illustrated in FIG. 14, the update policy includes a module ID, a version of the module, a violated policy type, and a handling method.

The disk image update section 505 updates a disk image of a target module in accordance with the handling method in the update policy in FIG. 14 based on the violated policy type included in the incident report in FIG. 13. In other words, the disk image update section 505 generates a disk image of a new version for resolving the anomalous operating state of the target module.

Specifically, when a newly received incident report matches a particular update policy, the disk image update section 505 generates a new version of the disk image in accordance with the handling method in the update policy.

For example, when a violated policy "valid account" is reported for the "login" module of a module version "3.8.5," what is observed is only a login trial using an invalid account by "userC," and hence the disk image is not updated. In other words, even though a violated policy is reported, the disk image is not necessarily be updated. In this case, the current version of the disk image is used for the subsequent processing, and the communication terminal 101 eventually turns on the target module, based on the current version of the disk image that is newly downloaded and not affected by the anomalous operation. In contrast, when a violated policy "login_from" is reported for the "login" module of the same version, this means that logging-in with an IP address ("192.168.33.24") not permitted to log in has been successful, and hence a disk image with the account being invalidated is generated.

In contrast, when the received incident report does not correspond to any update policy, an operator manually updates the disk image to generate a new version of the disk image.

Next, an operation example of the disk image division section 507 of the edge server 103 will be described in more detail.

The disk image division section 507 divides a disk image into a chunk size configured in advance to thereby generate divided disk images. For example, assume that the chunk size is configured as 4,000,000. In this case, to divide a disk image of 500 MB, based on $500 \times 1,000^2 / 4,000,000 = 125$, 125 divided disk images are created.

Note that the above-described method of dividing a disk image is an example, and divided disk images may be generated according to the granularity of a file, directory, or the like included in the disk image. In Open Container Initiative (OCI) Image Format v2, which is a next standard container format, a study has been performed for a scheme in which a disk image is divided, not on a layer-by-layer basis, but by granularity finer than a file, to reduce image size. For small update of a disk image and the like, what is only needed is to transmit update data of several kilobytes to a network.

1.8. Hardware Configuration

Figure 15:
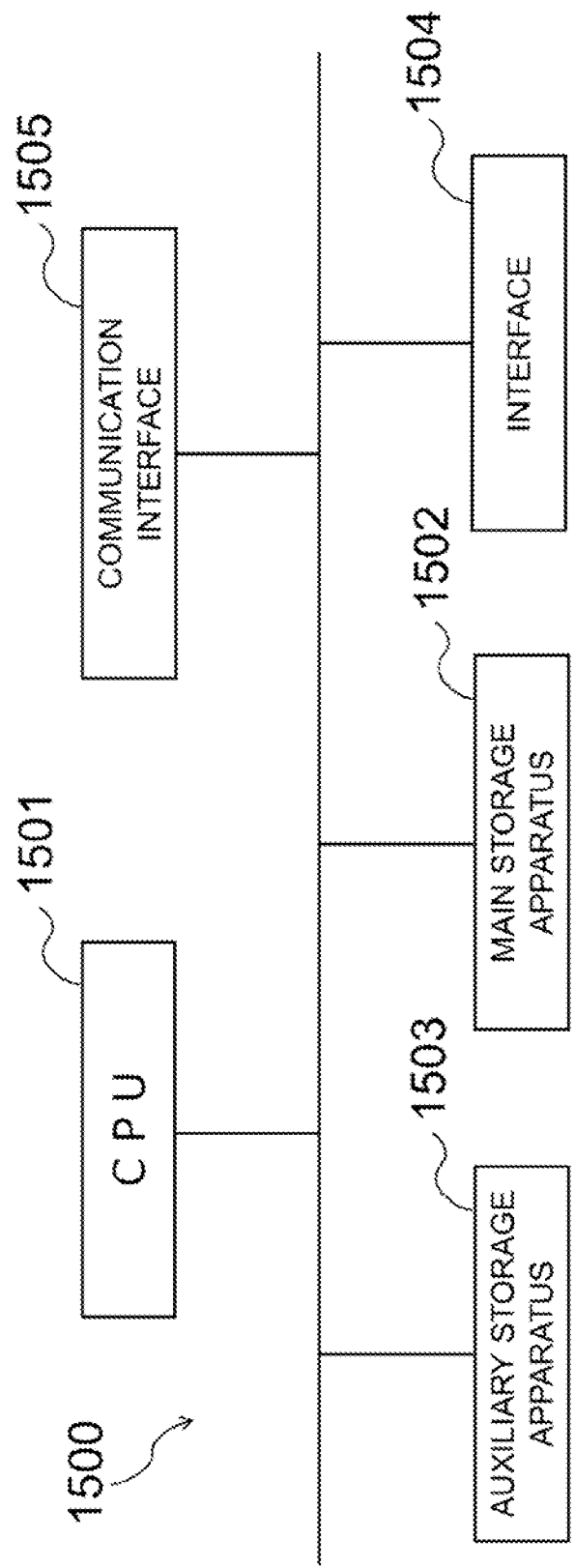
FIG. 15 is a schematic block diagram illustrating an example of a hardware configuration of a computer according to the first example embodiment.

FIG. 15 is a schematic block diagram illustrating an example of a hardware configuration of a computer according to the first example embodiment. The computer illustrated in FIG. 15 may operate as each of apparatuses including the communication terminal(s) 101, the storage device(s) 102, and the edge server(s) 103 configuring the distributed system of the present example embodiment.

A computer 1500 includes a CPU 1501, a main storage apparatus 1502, an auxiliary storage apparatus 1503, an interface 1504, and a communication interface 1505.

Operations of the computer 1500 are stored in the auxiliary storage apparatus 1503 in the form of program. The CPU 1501 reads the program from the auxiliary storage apparatus 1503 and deploys the program to the main storage apparatus 1502, and executes operations of a corresponding one of the apparatuses described in the present example embodiment, in accordance with the program.

The auxiliary storage apparatus 1503 is an example of a non-transitory tangible medium. Other examples of the non-transitory tangible medium include a magnetic disk, a magneto-optical disk, a compact disk read only memory (CD-ROM), a digital versatile disk read only memory (DVD-ROM), a semiconductor memory, and the like connected via the interface 1504. In a case of distributing the program to the computer 1500 through a communication line, the computer 1500 to which the program has been distributed may deploy the program to the main storage apparatus 1502 and operate in accordance with the program.

Part of or all the constituent elements of each of the apparatuses may be implemented by general-purpose or dedicated circuitry, processor, or the like, or a combination of these. These may be configured of a single chip or may be configured of a plurality of chips connected to each other via a bus. Part of or all the constituent elements may be implemented by a combination of the above-described circuitry or the like and the program.

The computer 1500 includes an unillustrated input/output apparatus and is configured to be capable of performing input/output operations by an operator or the like. Examples of the input apparatus include a mouse, a keyboard, and the like. Examples of the output apparatus include a display apparatus, such as a liquid crystal display. The display apparatus also includes a display apparatus that includes a touch panel and is configured to operate as an input apparatus.

1.9. Technical Features

The present example embodiment provides a secure system architecture focusing on a function recovery phase in cyber security. In the present example embodiment, the functions of the communication terminal 101 is modularized (by using a container architecture or the like), and divided disk images of a modularized function group are retained by the plurality of storage devices 102 arranged in the distributed system, which can consequently improve redundancy.

Moreover, according to the present example embodiment, the communication terminal 101 can download and activate a disk image for specific functions, allowing for the rapid provision of normal functionality even when certain functions have unintended design or operational behavior.

Since the communication terminal 101 collects divided disk images from the inside of the distributed system 100, the communication terminal 101 can download the divided disk images from a storage device via the neighboring communication terminal 101 even when the speed of connection to the Internet is low. This enables functions to recover at low communication cost in a short time.

It is also possible for a different communication terminal 101 having similar functions to download modified divided disk images from the storage device 102 to maintain the modules in the latest state (in other words, possible to increase the speed of a DevSecOps cycle).

Note that the above-described technical features are concrete examples of example embodiments of the present invention, and the example embodiments of the present invention are apparently not limited to the above-described technical features.

2. Second Example Embodiment

Next, a description will be given of a second example embodiment of the present invention with reference to FIG. 16. The above-described first example embodiment is a concrete example embodiment, whereas the second example embodiment is a more generalized example embodiment.

2.1. Configuration of System

Figure 16:
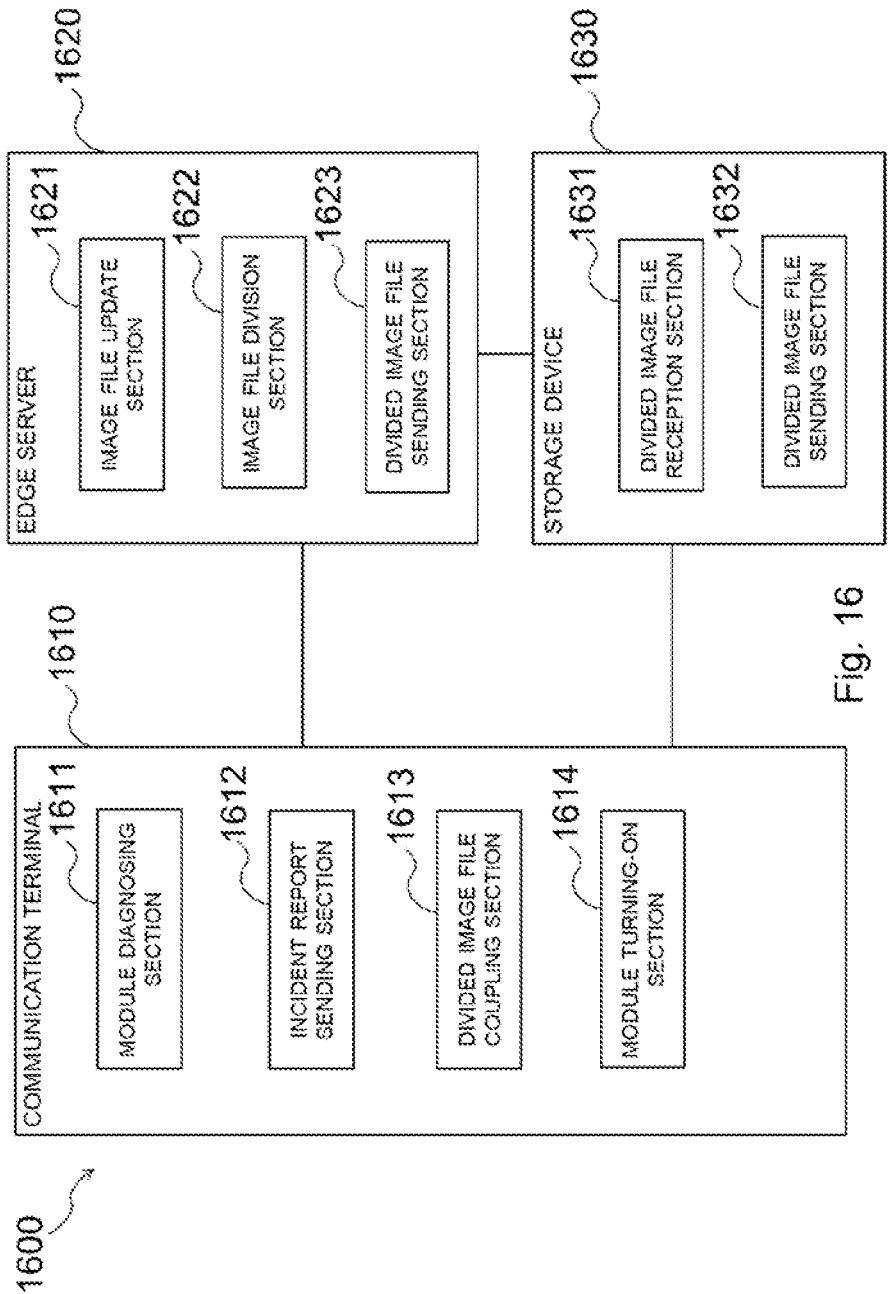
FIG. 16 is a schematic diagram of a distributed system according to a second example embodiment.

FIG. 16 is a schematic diagram of a distributed system according to the second example embodiment. A distributed system 1600 according to the present example embodiment includes a communication terminal 1610, an edge server 1620, and a storage device 1630. Note that the number of communication terminals 1610, the number of edge servers 1620, and the number of storage devices 1630 are not limited to those illustrated in FIG. 16. The communication terminal 1610, the edge server 1620, and the storage device 1630 are communicably connected to each other via a wired or wireless network.

The communication terminal 1610 includes a module diagnosing section 1611, an incident report sending section 1612, a divided disk image coupling section 1613, and a module turning-on section 1614. The module diagnosing section 1611 detects a functional module of anomalous operating state. The incident report sending section 1612 notifies the edge server 1620 of the anomalous operating state. The divided disk image coupling section 1613 couples divided disk images acquired from the storage device 1630 to thereby generate a disk image. The module turning-on section 1614 turns on the functional module and a related functional module, based on the generated disk image.

The edge server 1620 includes a disk image update section 1621, a disk image division section 1622, and a divided disk image sending section 1623. The disk image update section 1621 generates a disk image corresponding to each of the functional module and the related functional module. The disk image division section 1622 generates divided disk images obtained by dividing the generated disk image. The divided disk image sending section 1623 sends the generated divided disk images to the storage device 1630.

The storage device 1630 includes a divided disk image reception section 1631 and a divided disk image sending section 1632. The divided disk image reception section 1631 receives divided disk images from the edge server 1620 and stores the divided disk images. The divided disk image sending section 1632 sends divided disk images corresponding to the functional module and the related functional module to the communication terminal 1610 in response to a request from the communication terminal 1610.

Each of the processing sections of the above-described apparatuses is implemented with a central processing unit (CPU) of a computer configured to operate in accordance with a program and a communication interface of the computer, for example. For example, the CPU can read the program from a program recording medium, such as a program storage apparatus, of the computer and operate as each of the processing sections of the above-described apparatuses in accordance with the program by using the communication interface as needed.

2.2. Operation Example

Next, an operation example of the second example embodiment will be described.

According to the second example embodiment, the communication terminal 1610 detects a functional module of anomalous operating state and notifies the edge server 1620 of the anomalous operating state. The edge server 1620 generates a disk image corresponding to each of the functional module and the related functional module, generates divided disk images obtained by dividing the generated disk image, and sends the divided disk images to the storage device 1630. The storage device 1630 stores the divided disk images and sends divided disk images corresponding to the functional module and the related functional module to the communication terminal 1610 in response to a request from the communication terminal 1610. The communication terminal 1610 couples the divided disk images acquired from the storage device 1630 to thereby generate a disk image, and turns on the functional module and the related functional module, based on the generated disk image.

Relationship with First Example Embodiment

As an example, the communication terminal 1610, the edge server 1620, and the storage device 1630 of the second example embodiment are the communication terminal 101, the edge server 103, and the storage device 102 of the first example embodiment, respectively. In this case, the descriptions of the first example embodiment may also be applicable to the second example embodiment.

Note that the second example embodiment is not limited to this example.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the kinds of processing described in the Specification may not necessarily be executed in time series in the order described above. For example, the kinds of processing may be executed in an order different from that described above or may be executed in parallel. Some of the kinds of processing may be deleted, or more kinds of processing may be added.

An apparatus including constituent elements of the distributed system described in the Specification (e.g., one or more apparatuses (or units) among a plurality of apparatuses (or units) constituting the distributed system or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments described above can be described as, but not limited to, the following supplementary notes.

(Supplementary Note 1)

A distributed system in which one or more communication terminals, one or more storage devices, and an edge server communicate via a network, wherein the communication terminal is configured to detect a functional module of anomalous operating state, and to notify the edge server of the anomalous operating state;

the edge server is configured to generate respective disk images corresponding to the functional module and a related functional module, to generate a plurality of divided disk images obtained by dividing the generated disk image, and to send the plurality of divided disk images to the storage device;

the storage device is configured to store the divided disk images, and to send divided disk images corresponding to the functional module and the related functional module to the communication terminal in response to request from the communication terminal; and the communication terminal is configured to generate the disk image by coupling the plurality of divided disk images acquired from the storage device, and to turn on the functional module and the related functional module based on the generated disk image.

(Supplementary Note 2)

The distributed system according to supplementary note 1, wherein the communication terminal is configured to, in a case of detection of the functional module of the anomalous operating state, stop operations of the functional module and the related functional module and discard the functional module and the related functional module.

(Supplementary Note 3)

The distributed system according to supplementary note 1 or 2, wherein the communication terminal is configured to, in a case of detection of the functional module of the anomalous operating state, send an incident report indicating content of the anomalous operating state to the edge server.

(Supplementary Note 4)

The distributed system according to supplementary note 3, wherein the edge server is configured to generate the disk images in accordance with an update policy matching the content of the incident report.

(Supplementary Note 5)

The distributed system according to any one of supplementary notes 1 to 4, wherein the communication terminal is configured to acquire the divided disk images from a storage device neighboring on the communication terminal among a plurality of the storage devices.

(Supplementary Note 6)

The distributed system according to supplementary note 5, wherein the neighboring storage device is a storage device configured to directly establishing a communication link with the communication terminal.

(Supplementary Note 7)

The distributed system according to supplementary note 5, wherein the neighboring storage device is determined according to the number of hops with respect to the communication terminal.

(Supplementary Note 8)

The distributed system according to any one of supplementary notes 1 to 7, wherein the edge server is configured to send the plurality of divided disk images to a plurality of the storage devices included in a group configured in advance.

(Supplementary Note 9)

The distributed system according to any one of supplementary notes 1 to 8, wherein the communication terminal is configured to download the plurality of divided disk images in parallel.

(Supplementary Note 10)

A communication terminal configuring a distributed system, the communication terminal including:
- a module diagnosing means configured to diagnose operating states of a plurality of functional modules, and to detect a functional module of anomalous operating state;
- a module discarding means configured to stop the functional module of the anomalous operating state, and to discard the functional module;
- a divided disk image coupling means configured to acquire a plurality of divided disk images obtained by dividing a disk image corresponding to the functional module and generated to resolve the anomalous operating state, and to couple the plurality of divided disk images; and
- a module turning-on means configured to turn on the functional module, based on a disk image generated by coupling the plurality of divided disk images.

(Supplementary Note 11)

A function recovery method for a distributed system in which one or more communication terminals, one or more storage devices, and an edge server communicate via a network, the function recovery method including:
- a notification step of the communication terminal detecting a functional module of anomalous operating state, and notifying the edge server of the anomalous operating state;
- a first sending step of the edge server generating respective disk images corresponding to the functional module and a related functional module, generating a plurality of divided disk images obtained by dividing the generated disk image, and sending the plurality of divided disk images to the storage device;
- a second sending step of the storage device storing the divided disk images, and sending divided disk images corresponding to the functional module and the related functional module to the communication terminal in response to request from the communication terminal; and
- a turning-on step of the communication terminal generating the disk image by coupling the plurality of divided disk images acquired from the storage device, and turning on the functional module and the related functional module based on the generated disk image.

(Supplementary Note 12)

A program for causing a computer to function as the communication terminal according to supplementary note 10.

INDUSTRIAL APPLICABILITY

One example embodiment of the present invention is conceivable to be applied to a cyber physical system to serve as an infrastructure such as smart city. Moreover, one example embodiment of the present invention is conceivable to be applied to a mission-critical network system in which cyber-attacks by opponents are assumed.

REFERENCE SIGNS LIST

100 Distributed System
101 Communication Terminal
102 Storage Device
103 Edge Server
104 Obstacle
105 Cloud Server

What is claimed is:

1. A distributed system in which one or more communication terminals, one or more storage devices, and an edge server communicate via a network, wherein
   the communication terminal, comprising a memory storing instructions and one or more processors, is configured to execute the instructions to detect a functional module of anomalous operating state, and to notify the edge server of the anomalous operating state;
   the edge server, comprising a memory storing instructions and one or more processors, is configured to execute the instructions to generate respective disk images corresponding to the functional module and a related functional module, to generate a plurality of divided disk images obtained by dividing the generated disk image, and to send the plurality of divided disk images to the storage device;
   the storage device, comprising a memory storing instructions and one or more processors, is configured to execute the instructions to store the divided disk images, and to send divided disk images corresponding to the functional module and the related functional module to the communication terminal in response to request from the communication terminal; and
   the communication terminal, comprising a memory storing instructions and one or more processors, is configured to execute the instructions to generate the disk image by coupling the plurality of divided disk images acquired from the storage device, and to turn on the functional module and the related functional module based on the generated disk image.

2. The distributed system according to claim 1, wherein the communication terminal is configured to, in a case of detection of the functional module of the anomalous operating state, stop operations of the functional module and the related functional module and discard the functional module and the related functional module.

3. The distributed system according to claim 1, wherein the communication terminal is configured to, in a case of detection of the functional module of the anomalous operating state, send an incident report indicating content of the anomalous operating state to the edge server.

4. The distributed system according to claim 3, wherein the edge server is configured to generate the disk images in accordance with an update policy matching the content of the incident report.

5. The distributed system according to claim 1, wherein the communication terminal is configured to acquire the divided disk images from a storage device neighboring on the communication terminal among a plurality of the storage devices.

6. The distributed system according to claim 5, wherein the neighboring storage device is a storage device configured to directly establishing a communication link with the communication terminal.

7. The distributed system according to claim 5, wherein the neighboring storage device is determined according to the number of hops with respect to the communication terminal.

8. The distributed system according to claim 1, wherein the edge server is configured to send the plurality of divided disk images to a plurality of the storage devices included in a group configured in advance.

9. The distributed system according to claim 1, wherein the communication terminal is configured to download the plurality of divided disk images in parallel.

10. A communication terminal configuring a distributed system, the communication terminal comprising:
    a memory storing instructions; and
    one or more processors configured to execute the instructions to
        diagnose operating states of a plurality of functional modules, and to detect a functional module of anomalous operating state;
        stop the functional module of the anomalous operating state, and to discard the functional module;
        acquire a plurality of divided disk images obtained by dividing a disk image corresponding to the functional module and generated to resolve the anomalous operating state, and to couple the plurality of divided disk images; and
        turn on the functional module, based on a disk image generated by coupling the plurality of divided disk images.

11. A non-transitory computer readable recording medium storing a program for causing a computer to function as the communication terminal according to claim 10.

12. A function recovery method for a distributed system in which one or more communication terminals, one or more storage devices, and an edge server communicate via a network, the function recovery method comprising:
    a notification step of the communication terminal detecting a functional module of anomalous operating state, and notifying the edge server of the anomalous operating state;
    a first sending step of the edge server generating respective disk images corresponding to the functional module and a related functional module, generating a plurality of divided disk images obtained by dividing the generated disk image, and sending the plurality of divided disk images to the storage device;
    a second sending step of the storage device storing the divided disk images, and sending divided disk images corresponding to the functional module and the related functional module to the communication terminal in response to request from the communication terminal; and
    a turning-on step of the communication terminal generating the disk image by coupling the plurality of divided disk images acquired from the storage device, and turning on the functional module and the related functional module based on the generated disk image.

* * * * *